United States Patent
Jung

(10) Patent No.: US 9,595,739 B2
(45) Date of Patent: Mar. 14, 2017

(54) APPARATUS AND METHOD FOR CONTROLLING BATTERY

(71) Applicant: Hyundai Motor Company, Seoul (KR)

(72) Inventor: In-Sung Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 329 days.

(21) Appl. No.: 14/317,212

(22) Filed: Jun. 27, 2014

(65) Prior Publication Data
US 2015/0147603 A1    May 28, 2015

(30) Foreign Application Priority Data
Nov. 26, 2013    (KR) .......................... 10-2013-0144460

(51) Int. Cl.
| | |
|---|---|
| H02J 7/00 | (2006.01) |
| H01M 10/42 | (2006.01) |
| H01M 10/48 | (2006.01) |
| B60L 3/00 | (2006.01) |
| B60L 3/12 | (2006.01) |
| B60L 11/18 | (2006.01) |

(52) U.S. Cl.
CPC ....... *H01M 10/4207* (2013.01); *B60L 3/0046* (2013.01); *B60L 3/12* (2013.01); *B60L 11/1861* (2013.01); *B60L 11/1866* (2013.01); *B60L 11/1887* (2013.01); *H01M 10/425* (2013.01); *H01M 10/482* (2013.01); *B60L 2200/10* (2013.01); *B60L 2200/18* (2013.01); *B60L 2200/32* (2013.01); *B60L 2200/36* (2013.01); *B60L 2200/40* (2013.01); *B60L 2210/30* (2013.01); *B60L 2240/545* (2013.01); *B60L 2240/547* (2013.01); *B60L 2240/549* (2013.01); *H01M 2010/4271* (2013.01); *H01M 2220/20* (2013.01); *Y02T 10/7044* (2013.01); *Y02T 10/7061* (2013.01); *Y02T 10/7241* (2013.01); *Y02T 90/34* (2013.01)

(58) Field of Classification Search
CPC .................. H01M 10/4207; H01M 2010/4271
USPC .......................................................... 320/132
See application file for complete search history.

(56) References Cited

U.S. PATENT DOCUMENTS

| | | | | |
|---|---|---|---|---|
| 6,650,089 | B1 * | 11/2003 | Freeman ............... | H02J 7/0047 320/130 |
| 2010/0244574 | A1 * | 9/2010 | Nishino .................. | A61B 6/00 307/80 |
| 2011/0068744 | A1 | 3/2011 | Zhu | |
| 2013/0249497 | A1 * | 9/2013 | Suzuki ............... | H01M 10/441 320/136 |

FOREIGN PATENT DOCUMENTS

| | | |
|---|---|---|
| JP | 08-289477 A | 11/1996 |
| JP | 2007-015428 A | 1/2007 |

(Continued)

*Primary Examiner* — M'Baye Diao
(74) *Attorney, Agent, or Firm* — Mintz Levin Cohn Ferris Glovsky and Popeo, P.C.; Peter F. Corless

(57) ABSTRACT

An apparatus and method for controlling a battery are provided. The apparatus includes a battery pack and a battery management system (BMS). The BMS is configured to calculate a battery state by sensing the battery pack and perform a selective control to select a control object of a unit element of the battery pack or an intensive control to intensively use the control object of the unit element using the battery state.

16 Claims, 5 Drawing Sheets

FIG.3

(56) References Cited

FOREIGN PATENT DOCUMENTS

| | | |
|---|---|---|
| JP | 2007-069841 A | 3/2007 |
| JP | 2007-181365 A | 7/2007 |
| JP | 2008-041458 A | 2/2008 |
| JP | 2009-231197 A | 10/2009 |
| KR | 10-2007-0096372 | 10/2007 |
| KR | 10-2011-0111018 A | 10/2011 |
| KR | 10-2012-0075398 | 7/2012 |
| KR | 10-20130025561 | 3/2013 |

\* cited by examiner

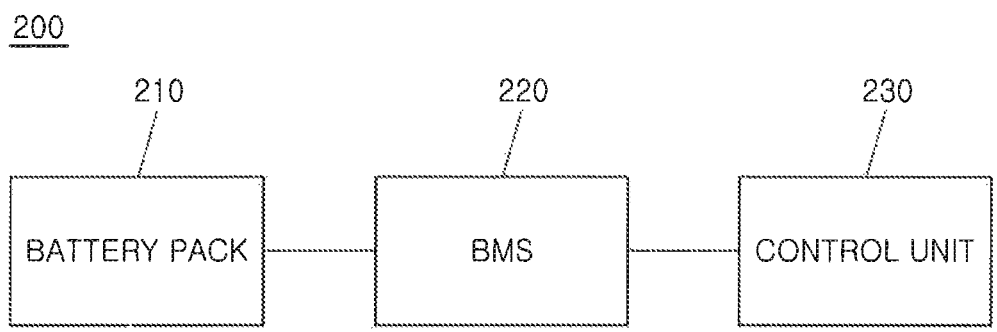

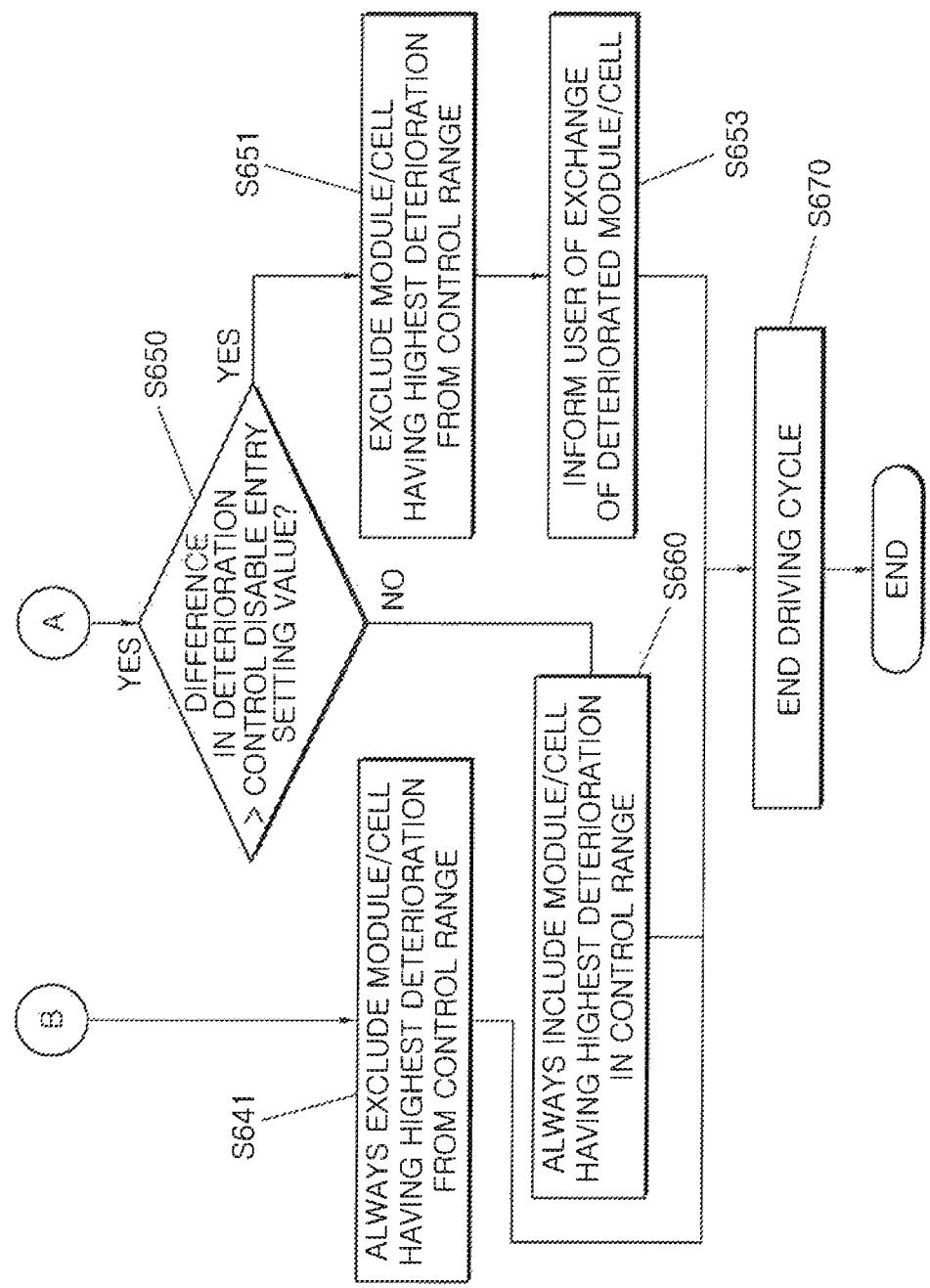

APPARATUS AND METHOD FOR CONTROLLING BATTERY

CROSS-REFERENCE TO RELATED APPLICATION

This application claims the benefit of priority to Korean Patent Application No. 10-2013-0144460 filed on Nov. 26, 2013, the entire contents of which are incorporated herein by reference.

TECHNICAL FIELD

The present invention relates to a battery technology, and more particularly, to an apparatus and a method for controlling a battery, in which more battery cells than the number of battery cells of performance required by a vehicle are mounted and the battery cells are selectively controlled.

BACKGROUND

Each of a plurality of battery cells within a battery pack has a difference in characteristics from each other and has deterioration differences from each other as a use time of the battery cell is increased. Further, deterioration or a fault diagnosis of the battery may intermittently occur during the use of the battery. Since performance of the battery pack is estimated based on the battery cell having the poorest performance, there is a need to always perform a control to secure the performance of the battery pack by minimally maintaining the difference in the performance of all the battery cells, such as a voltage deviation in the battery cells within the battery pack. Each of the battery cells configuring the battery pack have been used for a charging/discharging operation independent of a difference in performance and deterioration. In this condition, as the use time is increased, the difference in performance and deterioration between the battery cells may be increasingly substantial.

Although a battery management system (BMS) performs a control to reduce the performance deviation of all the battery cells, the difference in deterioration between the battery cells may deviate from a control range of the BMS. In particular, sudden deterioration to the performance of the battery pack may occur due to specific battery cells which are considerably deteriorated. A related apparatus of the related art is illustrated in FIG. 1. Referring to FIG. 1, an apparatus for managing a battery system includes a performance measuring unit 100, a cell switching unit 120, and a controller 130, and the like.

When the measuring voltage of the battery cell 10 is greater or less than a predetermined reference voltage, the controller 130 operates the cell switching unit 120 of the corresponding battery cell 10 to block a connection with another battery cell 10. In other words, under the assumption that the battery has appropriate specifications required by the system, the corresponding battery cell is blocked when control problems occur. Further, only the battery having a problem is blocked and thus the corresponding battery is not used. In addition, only the battery cell having lower performance than the absolute reference performance is blocked.

However, according to the method, since there is a need to always perform a control even when the battery module/cell with a substantial difference in deterioration, the discharge rate of the battery module/cell with substantial deterioration is rapid. As a result, the overall battery pack may need to be replaced. Further, the battery with a problem is blocked, and therefore the remaining performance of the blocked battery cell may not be sufficiently used. Since only the battery with appropriate specifications is mounted, when the corresponding battery cell is blocked, the number of usable battery cells decreases, thereby causing the problem in that the performance and use time of the battery pack may correspondingly decrease.

SUMMARY

The present invention provides an apparatus and a method for controlling a battery that may prevent deterioration of a specific battery module/cell from suddenly increasing and extending lifespan of the overall battery pack. In addition, the present invention provides an apparatus and a method for controlling a battery that exclude or intensively deteriorate a specific battery module/cell even when the performance of the specific battery module/cell is reduced due to factors in addition to deterioration.

The apparatus for controlling a battery may include: a battery pack; and a battery management system (BMS) configured to calculate a battery state by sensing the battery pack and perform a selective control to select a control object of a unit element of the battery pack or an intensive control to intensively use the control object of the unit element using the battery state.

The unit element may be at least one of a plurality of battery cells and a plurality of battery modules having the plurality of battery cells. The battery state may be deterioration or a difference in deterioration. The deterioration may be calculated for each battery cell or each battery module. The difference in deterioration may be a difference in deterioration between a battery cell having highest deterioration and the remaining battery cells or a difference in deterioration between a battery module having highest deterioration and the remaining battery modules. The plurality of battery cells may each further include a cell controller configured to turn on and off and the plurality of battery modules may each further include a module controller configured to turn on and off.

The selective control may include a first selective control to perform an intensive deterioration or an exclusion from the control object in response to determining that the highest deterioration is greater than an intensive deterioration entry setting value and a second selective control to perform the exclusion from the control object when the highest deterioration is less than the setting value, by comparing the highest deterioration with the intensive deterioration entry setting value.

The first selective control may perform the exclusion from the control object in response to determining that the highest deterioration is greater than a control entry setting value and perform the intensive deterioration in response to determining that that the highest deterioration is less than the control entry setting value, by determining whether the highest deterioration is greater than the control entry setting disable value.

The intensive deterioration may use residual performance by intensively deteriorating the battery module or the battery cell corresponding to a condition. The exclusion from the control object may be a temporary exclusion to temporarily exclude the battery module or the battery cell corresponding to the conditions from the control object or a permanent exclusion to permanently exclude the battery module or the battery cell. The number of battery cells or the number of battery modules may be installed to be more than a number required in vehicle performance. The apparatus for controlling a battery may further include a controller configured to output guide information based on the selective control or the intensive control.

In accordance with an exemplary embodiment of the present invention, an apparatus for controlling a battery may include: a battery pack; a battery management system (BMS) configured to calculate battery pack information by sensing the battery pack and perform a selective control or a deterioration control using the calculated battery pack information; and a controller configured to output guide information based on the selective control or an intensive control. The battery pack information may be any one of a capacity size and change difference between battery cells of the battery pack, a voltage change difference, an absolute voltage difference, a sudden reduction in battery performance, and a diagnosis occurrence of packaging portions of the battery cell and the battery pack.

In accordance with another exemplary embodiment of the present invention, a method for controlling a battery may include: calculating a battery state by sensing a battery pack; and performing a selective control to select a control object of a unit element of the battery pack or an intensive control to intensively use the control object of the unit element, by using the battery state.

The controlling may include: determining whether a highest deterioration is greater than an intensive deterioration entry setting value; performing a first selective control to perform an intensive deterioration or an exclusion from the control object when the highest deterioration is greater than the setting value; and performing a second selective control to perform the exclusion from the control object when the highest deterioration is less than the setting value. In the performing of the first selective control, the exclusion from the control object may be performed in response to determining that the highest deterioration is greater than a control entry setting value and the intensive deterioration may be performed in response to determining that the highest deterioration is less than the control entry setting value, by determining whether the highest deterioration is greater than the control entry setting disable value. The method for controlling a battery may further include outputting guide information based on the selective control or the intensive control.

BRIEF DESCRIPTION OF THE DRAWINGS

The above and other objects, features and advantages of the present invention will be more apparent from the following detailed description taken in conjunction with the accompanying drawings, in which:

FIG. 2 is an exemplary diagram illustrating a configuration of an apparatus 200 for controlling a battery according to an exemplary embodiment of the present invention;

FIG. 3 is an exemplary configuration of battery modules 310a to 310n and module controllers 311a to 311n operating the battery modules within a battery pack 210 illustrated in FIG. 2 according to an exemplary embodiment of the present invention;

FIGS. 6A and 6B are exemplary flow charts illustrating a process of selectively controlling and intensively using a battery cell according to an exemplary embodiment of the present invention.

DETAILED DESCRIPTION

Figure 1:
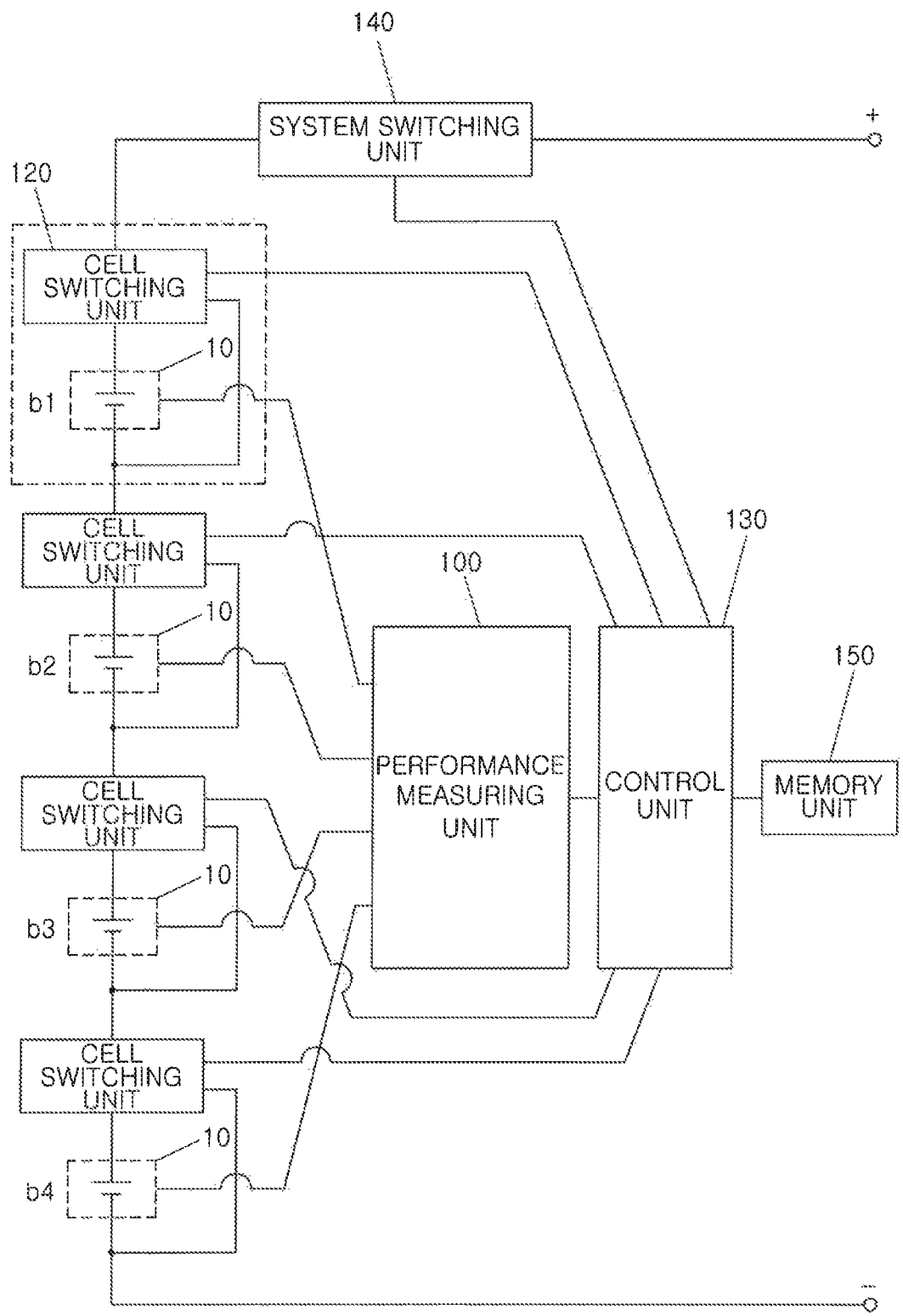
FIG. 1 is an exemplary configuration diagram illustrating a general battery system according to the related art.

Since the present invention may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present invention. Throughout the accompanying drawings, the same reference numerals will be used to describe the same components.

Terms used in the specification, 'first', 'second', etc., may be used to describe various components, but the components are not to be construed as being limited to the terms. The terms are used to distinguish one component from another component. For example, the 'first' component may be named the 'second' component and the 'second' component may also be similarly named the 'first' component, without departing from the scope of the present invention. The term 'and/or' includes a combination of a plurality of items or any one of a plurality of terms.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an apparatus and a method for controlling a battery according to an exemplary embodiment of the present invention will be described in detail with reference to the accompanying drawings. FIG. 2 is an exemplary diagram illustrating a configuration of an apparatus 200 for controlling a battery according to an exemplary embodiment of the present invention. Referring to FIG. 2, the apparatus 200 for controlling a battery may include a battery pack 210, a battery management system 220 configured to calculate deterioration by sensing the battery pack 210, calculate a difference in deterioration using the calculated deterioration, and selectively perform an intensive deterioration state control or a disable state control using a difference in the calculated deterioration, a controller 230 configured to output a guide message for the disable state control, and the like.

Figure 4:
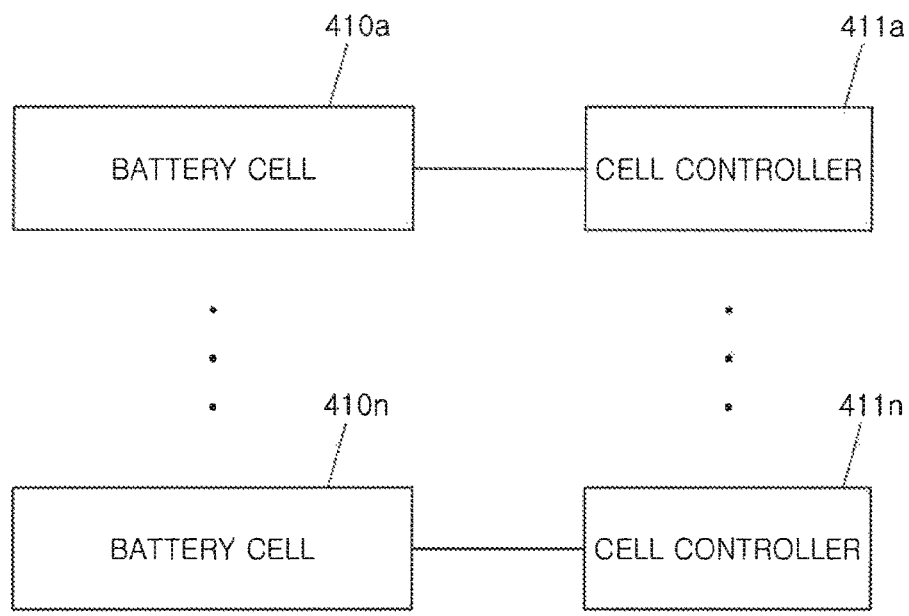
FIG. 4 is an exemplary configuration of battery cells 410a to 410n and cell controllers 411a to 411n operating the battery cells within the battery module 310a illustrated in FIG. 4 according to an exemplary embodiment of the present invention.

The battery pack 210 may include a plurality of battery modules. Further, the plurality of battery modules may include battery cells connected to each other in series and/or in parallel, in which the battery cell may be a battery for an electric vehicle, such as a nickel metal battery and a lithium ion battery. Herein, as the example of the electric vehicle, there may be an electric vehicle (EV), a hybrid electric vehicle (HEV), a plug-in hybrid electric vehicle (PHEV), a fuel cell vehicle, and the like. FIGS. 3 and 4 illustrate a configuration of the battery pack 210.

FIG. 3 is an exemplary configuration of battery modules 310a to 310n and module controllers 311a to 311n configured to operate the battery modules 310a to 310n disposed within a battery pack 210 illustrated in FIG. 2. FIG. 3 illustrates an exemplary configuration of the first to n-th battery modules 310a to 310n. Further, referring to FIG. 3, for convenience of understanding, the battery modules 310a to 310n are connected to each other in series but are not limited thereto and therefore may be connected to each other in series and/or in parallel.

Further, each of the first to n-th battery modules 310a to 310n may include the first to n-th module controllers 311a to 311n configured to turn on or off based on the control of the BMS 220 (FIG. 2). For the module controllers 311a to 311n, switching devices, such as a metal oxide semiconductor field effect transistor (MOSFET) device, a relay device, a triac, a silicon controlled rectifier (SCR), an integrated circuit (IC), and the like, may be used. Further, in FIG. 3, the module controllers 311a to 311n may be separately configured, but may each be configured within the battery modules 310a to 310n.

FIG. 4 is an exemplary configuration of battery cells 410a to 410n and cell controllers 411a to 411n configured to operate the battery cells 410a to 410n disposed within the battery module 310a illustrated in FIG. 4. Referring to FIG. 4, the first to n-th battery modules 410a to 410n may be configured within the battery module 310a. Further, referring to FIG. 4, for convenience of understanding, the battery modules 410a to 410n are connected to each other in series but are not limited thereto and therefore may be connected to each other in series and/or in parallel.

Further, each of the first to n-th battery modules 410a to 410n may include the first to n-th module controllers 411a to 411n configured to turn on or off based on the control of the BMS 220 (FIG. 2). Similar to one illustrated in FIG. 3, for the module controllers 411a to 411n, the switching devices, such as a metal oxide semiconductor field effect transistor (MOSFET) device, a relay device, a triac, a silicon controlled rectifier (SCR), an integrated circuit (IC), and the like, may be used. Further, in FIG. 4, the module controllers 411a to 411n are separately configured, but may each be configured within the battery cells 410a to 410n.

Further, the number of battery cells 410a to 410n and/or the battery modules 310a to 310n configuring the battery pack 210 (FIG. 2) require more than the number of modules and/or cells required for the vehicle performance. For example, when the number of components required in the vehicle performance is 9 modules 72 cells, the exemplary embodiment of the present invention may include an example in which 10 modules 80 cells are configured.

Figure 5:
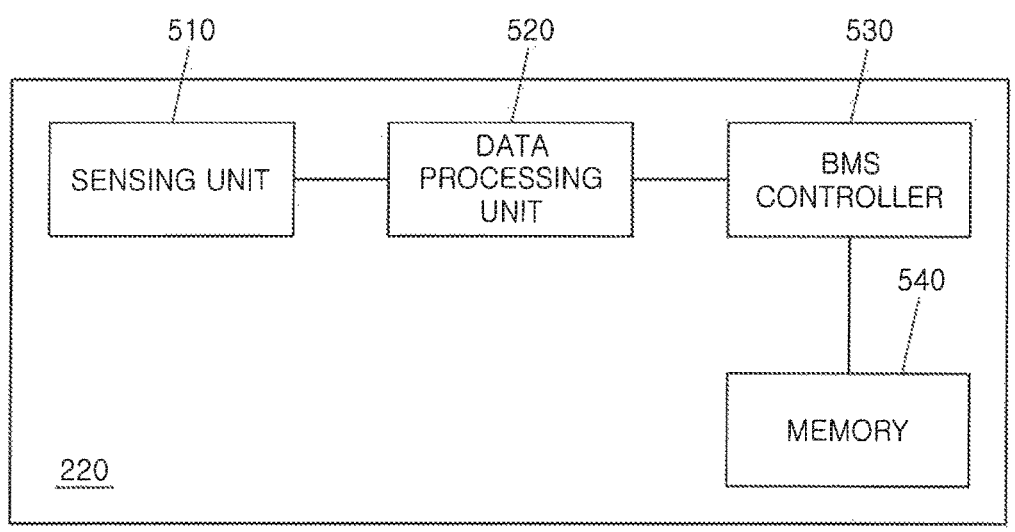
FIG. 5 is an exemplary block diagram illustrating a detailed configuration of a battery management system (BMS) 220 illustrated in FIG. 2 according to an exemplary embodiment of the present invention.

FIG. 5 is an exemplary diagram illustrating a detailed configuration of a battery management system 220 illustrated in FIG. 2. Referring to FIG. 5, the BMS 220 may include: a sensing unit 510 configured to sense the battery cells 410a to 410n and/or the battery modules 310a to 310n, a data processing unit 520 configured to process a sensing signal generated by the sensing unit 510 to generate a battery data, a BMS controller 530 configured to generate deterioration of the battery cells 410a to 410n and/or the battery modules 310a to 310n, a difference in deterioration, a state of charge (SOC), a state of health (SOH), and the like, using the generated battery data, transmit the information to the controller 230 (FIG. 2) or receive and process control information, and the like from the controller 230 (FIG. 2), and turn on/off the battery cells 410a to 410n and/or the battery modules 310a to 310n, a memory 540 configured to store the generated battery data, an algorithm, and the like for managing the battery pack 210, and the like.

The sensing unit 510 may include a current sensor configured to sense a current of the battery cells 410a to 410n and/or the battery modules 310a to 310n, a voltage sensor configured to sense a voltage, a temperature sensor configured to sense temperature, and the like. The memory 540 may be configured within the BMS 220 and may be a separate memory. Therefore, the memory may be configured of a combination of a non-volatile memory, such as a hard disk drive, a flash memory, an electrically erasable programmable read-only memory (EEPROM), a static RAM (SRAM), a ferro-electric RAM (FRAM), a phase-change RAM (PRAM), and a magnetic RAM (MRAM) and/or a volatile memory, such as a dynamic random access memory (DRAM), a synchronous dynamic random access memory (SDRAM), and a double data rate-SDRAM (DDR-SDRAM).

The BMS 220 may include deterioration recording information regarding the battery cells 410a to 410n and/or the battery modules 310a to 310n before the current point. The deterioration may be measured and calculated by any control logic for calculating deterioration, such as a voltage change rate, based on the state of charge (SOC). Whether a controller is based on a module or a cell may be selected based on the BMS 220 logic.

Figure 6A:
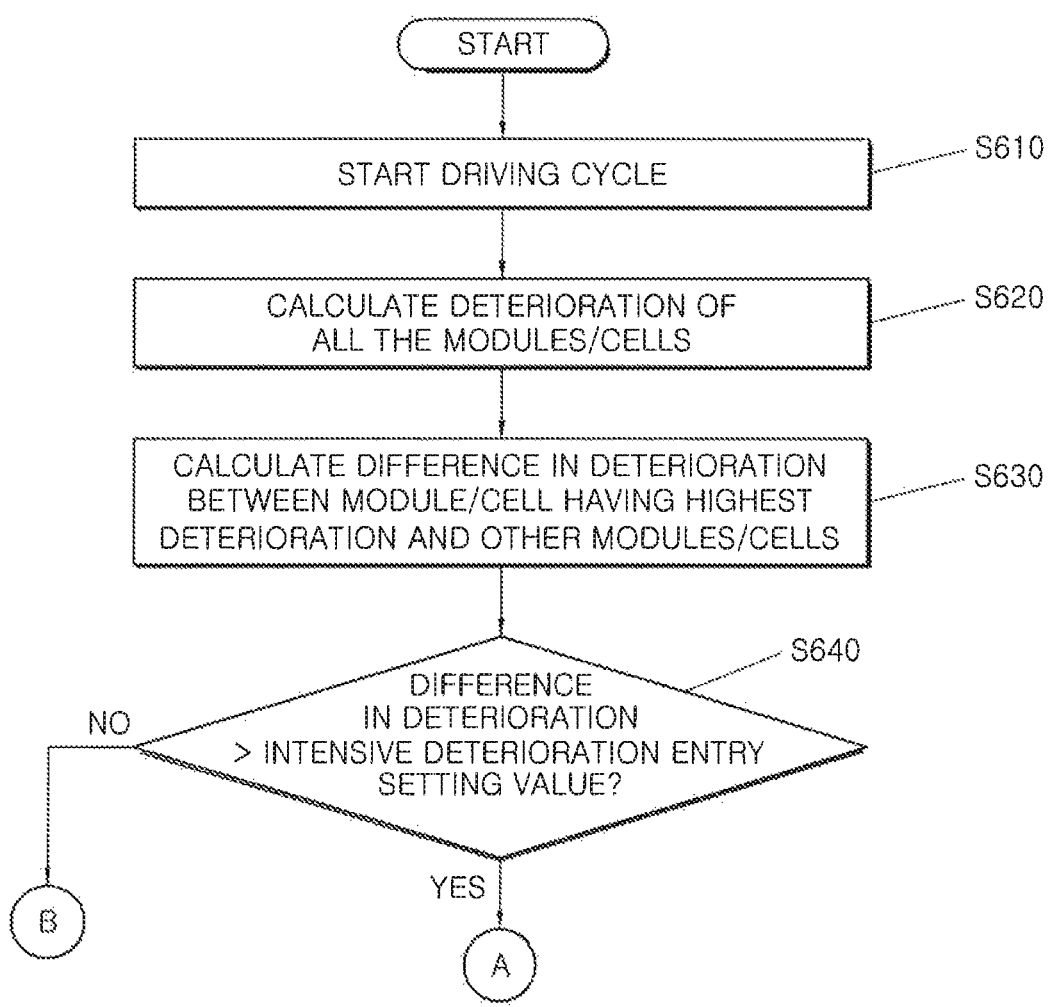

FIGS. 6A and 6B are exemplary flow charts illustrating a process of selectively controlling and intensively using a battery cell according to an exemplary embodiment of the present invention. Referring to FIGS. 6A and 6B, when a driving cycle starts, the BMS 220 may be configured to calculate the deterioration by sensing the battery pack 210 (FIG. 2) and calculate the difference in deterioration using the calculated deterioration (steps S620 and S630). In other words, the deterioration of all the battery cells 410a to 410n and/or battery modules 310a to 310n may be calculated and the difference in deterioration between the battery modules and/or cells having the highest deterioration and the remaining battery modules and/or cells may be calculated using the calculated deterioration. In FIGS. 6A and 6B, the deterioration and/or the difference in deterioration are described as the battery state but are not limited thereto and therefore the state of health (SOH), the state of charge (SOC), a state of function (SOF), and the like of the battery may be used.

When the difference in deterioration is calculated, whether the difference in deterioration corresponds to an intensive deterioration state condition may be determined to perform an intensive control or a selective control using the calculated difference in deterioration (step S640). In other words, whether the difference in deterioration is greater than an intensive deterioration entry setting value may be determined. As the determination result, in response to determining that the difference in deterioration is less than the setting value, the battery module and/or cell having the highest deterioration may be excluded from a control object (e.g., or control range) and the driving cycle ends (steps S641 and S670).

Further, in step S640, when the difference in deterioration is greater than the intensive deterioration entry setting value, whether the difference in deterioration corresponds to a control disable state condition may be determined to perform a disable state control which may not perform a control (step S650). In other words, whether the difference in deterioration is greater than the control disable entry setting value may be determined. As the determination result, in response to determining that the difference in deterioration is less than the setting value, the battery module and/or cell having the highest deterioration may be included in the control object and the driving cycle ends (steps S660 and S670).

In the step S650, in response to determining the difference in deterioration is greater than the control disable entry setting value, the battery module and/or cell having the highest deterioration may be from the control object and the guide message such as an exchange request of the deteriorated battery module and/or cell, and the like may be output to a user and the driving cycle may end (steps S651, S653, and S670).

FIGS. 6A and 6B will be simply described below.

First, Minimization Control Method of Difference in Deterioration.

1. When an initial operation of the BMS 220 (FIG. 2) starts, the deterioration information of the battery modules/cells configuring the battery pack may be used.

2. An operation to exclude the battery module and/or cell having the highest deterioration from the control object of the BMS 220 may be performed.

3. As the use of the battery pack 210 is accumulated, an object having the highest deterioration may be continuously changed. Therefore, the BMS may be configured to change the battery module/cell excluded from the control object to meet thereto.

Second, Intensive Control Method of Specific Battery Module and/or Cell

1. The BMS 220 has the intensive deterioration state condition of the battery cell and/or module (e.g., when the difference in deterioration from other battery modules/cells is greater than a predetermined level, etc.). Further, the BMS 220 may have the control disable state condition and the battery pack stripping condition of the deteriorated battery module and/or cell.

2. When the initial operation of the BMS starts, the deterioration information regarding the battery modules and/or cells configuring the battery pack may be used.

3. When the specific battery module and/or cell are the intensive deterioration object by the control logic of the BMS 220, the BMS may include the corresponding battery module and/or cell in the BMS control object. The corresponding battery module and/or cell used may have a substantially rapid deterioration rate, quicker than that of other modules and/or cells.

4. In response to determining that the specific battery module and/or satisfy the control disable state condition by the control logic of the BMS 220, the BMS 20 may be operated to exclude the corresponding battery module and/or cell from the control object of the BMS and transfer necessary guide information, such as an exchange of the battery, to a user. In other words, characters and/or graphics, and the like may be output to a vehicle cluster graphic user interface (GUI) (not illustrated) or an alarm sound, and the like may be output.

Therefore, the BMS 220 may be configured to perform a control by selecting one of the minimization control method in a difference in deterioration and the intensive deterioration control method described above and may operate both of them. On the other hand, according to another exemplary embodiment of the present invention, the selective control of the battery may be performed based on another determination criterion other than the deterioration. In other words, various determination criteria, such as a capacity size and change difference between the battery cells, a voltage change difference, and an absolute voltage difference may be set. The BMS 220 may be configured to calculate battery pack information by sensing the battery pack 210 and perform the intensive control or the disable state control using the calculated battery pack information.

Further, as the exclusion from the control object, a temporary exclusion to temporarily exclude the battery module and/or the battery cell corresponding to the conditions from the control object and a permanent exclusion to permanently exclude the same may be performed. Further, the sudden degradation in the battery performance, such as the sudden reduction in battery voltage, in addition the difference in cell characteristics which are progressed for a substantial period of time may occur or the control described above may be selectively performed even when the diagnosis of the cell and packaging portion is performed.

According to the exemplary embodiments of the present invention, the battery module/cell with a problem may not be controlled until the battery module/cell with a greater deterioration occurs and the deterioration of the specific battery module/cell may be prevented from suddenly increasing, thereby extending the lifespan of the overall battery pack. Further, according to the exemplary embodiments of the present invention, when the specific battery module/cell are controlled, since other battery modules/cells may be beyond the control range, the battery lifespan may be increased in terms of the overall battery pack.

In addition, according to the exemplary embodiments of the present invention, when the specific battery module/cell (independent of the deterioration) is broken (e.g., failure occurs), the corresponding battery module/cell may be excluded from the control condition, thereby more smoothly operating the battery pack. Moreover, according to the exemplary embodiments of the present invention, even when the performance of the specific battery module/cell is reduced due to the factors in addition to the deterioration, the method for excluding the specific battery module/cell from the control range or intensively deteriorating the specific battery module/cell may be possible.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

What is claimed is:

1. An apparatus for controlling a battery, comprising:
   a battery pack; and
   a battery management system (BMS) configured to calculate a battery state by sensing the battery pack and perform a selective control to select a control object of a unit element of the battery pack or an intensive control to intensively use the control object of the unit element using the battery state,
   wherein the unit element is at least one of: a plurality of battery cells and a plurality of battery modules having the plurality of battery cells,
   wherein the battery state is deterioration or a difference in deterioration, the deterioration is calculated for each battery cell or each battery module, and the difference in deterioration is a difference in deterioration between a battery cell having highest deterioration and the remaining battery cells or a difference in deterioration between a battery module having highest deterioration and the remaining battery modules, and
   wherein the selective control includes:
      a first selective control to perform an intensive deterioration or an exclusion from control object in response to determining that the highest deterioration is greater than an intensive deterioration entry setting value; and
      a second selective control to perform the exclusion from the control object when the highest deterioration is less than the setting value, by comparing the highest deterioration with the intensive deterioration entry setting value.

2. The apparatus of claim 1, wherein the plurality of battery cells each include a cell controller configured to turn on and off and the plurality of battery modules each include a module controller configured to turn on and off.

3. The apparatus of claim 1, wherein the first selective control performs the exclusion from the control object in response to determining that the highest deterioration is greater than a control entry setting value and performs the intensive deterioration in response to determining that the highest deterioration is less than the control entry setting value, by determining whether the highest deterioration is greater than the control entry setting disable value.

4. The apparatus of claim 3, wherein the intensive deterioration uses residual performance by intensively deteriorating the battery module or the battery cell corresponding to a condition.

5. The apparatus of claim 3, wherein the exclusion from the control object is a temporary exclusion to temporarily exclude the battery module or the battery cell corresponding to the conditions from the control object or a permanent exclusion to exclude the battery module or battery cell corresponding to the conditions.

6. The apparatus of claim 1, wherein the number of battery cells or the number of battery modules is installed to be greater than a number required in vehicle performance.

7. The apparatus of claim 1, further comprising:
   a controller configured to output user guide information based on the selective control or the intensive control.

8. An apparatus for controlling a battery, comprising:
   a battery pack;
   a battery management system (BMS) configured to calculate battery pack information by sensing the battery pack and perform a selective control or a deterioration control of a control object using the calculated battery pack information; and
   a controller configured to output guide information based on the selective control or an intensive control,
   wherein the Selective control includes:
      a first selective control to perform an intensive deterioration or an exclusion from the control object in response to determining that a highest deterioration is greater than an intensive deterioration entry setting value; and
      a second selective control to perform the exclusion from the control object when the highest deterioration is less than the setting value, by comparing the highest deterioration with the intensive deterioration entry setting value.

9. The apparatus of claim 8, wherein the battery pack information is selected from a group consisting of: a capacity size and change difference between battery cells of the battery pack, a voltage change difference, an absolute voltage difference, a sudden reduction in battery performance, and a diagnosis occurrence of packaging portions of the battery cell and the battery pack.

10. A method for controlling a battery, comprising:
    calculating, by a controller, a battery state by sensing a battery pack;
    performing, by a controller, a selective control to select a control object of a unit element of the battery pack or an intensive control to intensively use the control object of the unit element, using the battery state;
    determining, by the controller, whether a highest deterioration is greater than an intensive deterioration entry setting value;
    performing, by the controller, a first selective control to perform an intensive deterioration or an exclusion from the control object when the highest deterioration is greater than the setting value; and
    performing, by the controller, a second selective control to perform the exclusion from the control object when the highest deterioration is less than the setting value.

11. The method of claim 10, wherein the unit element is at least one of: a plurality of battery cells and a plurality of battery modules having the plurality of battery cells.

12. The method of claim 11, wherein the battery state is deterioration or a difference in deterioration, the deterioration is calculated for each battery cell or each battery module, and the difference in deterioration is a difference in deterioration between a battery cell having highest deterioration and the remaining battery cells or a difference in deterioration between a battery module having highest deterioration and the remaining battery modules.

13. The method of claim 11, wherein the number of battery cells or the number of battery modules is installed to be greater than a number required in vehicle performance.

14. The method of claim 10, wherein in the performing of the first selective control, the exclusion from the control object is performed in response to determining that the highest deterioration is greater than a control entry setting value and the intensive deterioration is performed in response to determining that the highest deterioration is less than the control entry setting value, by determining whether the highest deterioration is greater than the control entry setting disable value.

15. The method of claim 14, wherein the intensive deterioration uses residual performance by intensively deteriorating the battery module or the battery cell corresponding to a condition.

16. The method of claim 14, wherein the exclusion from the control object is a temporary exclusion to temporarily exclude the battery module or the battery cell corresponding to the conditions from the control object or a permanent exclusion to exclude the battery module or the battery cell corresponding to the conditions.

* * * * *